United States Patent
Tarte et al.

(10) Patent No.: US 12,466,458 B2
(45) Date of Patent: Nov. 11, 2025

(54) VEHICLE STEERING WHEEL

(71) Applicant: Autoliv Development AB, Vargarda (SE)

(72) Inventors: Frederic Tarte, Biard (FR); Jeremie Point, Cherves (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/690,944

(22) PCT Filed: Sep. 6, 2022

(86) PCT No.: PCT/EP2022/074705
§ 371 (c)(1),
(2) Date: Mar. 11, 2024

(87) PCT Pub. No.: WO2023/041370
PCT Pub. Date: Mar. 23, 2023

(65) Prior Publication Data
US 2025/0136167 A1    May 1, 2025

(30) Foreign Application Priority Data
Sep. 17, 2021   (FR) ..................... 2109808

(51) Int. Cl.
*B62D 1/04* (2006.01)
*B60R 16/02* (2006.01)
*B62D 1/06* (2006.01)

(52) U.S. Cl.
CPC .......... *B62D 1/046* (2013.01); *B60R 16/0215* (2013.01); *B60Y 2410/115* (2013.01); *B62D 1/06* (2013.01)

(58) Field of Classification Search
CPC .......... B62D 1/06; B62D 1/065; B62D 1/046; B60Y 2410/115; B60R 16/0215
See application file for complete search history.

(56) References Cited

U.S. PATENT DOCUMENTS

| | | | | |
|---|---|---|---|---|
| 4,547,655 A | * | 10/1985 | Kurata | B62D 1/065 |
| | | | | 219/535 |
| 6,093,908 A | * | 7/2000 | Haag | B62D 1/065 |
| | | | | 219/204 |
| 10,358,160 B2 | * | 7/2019 | Yamami | B62D 1/06 |
| 10,597,059 B2 | | 3/2020 | Inaba et al. | |
| 11,029,438 B2 | * | 6/2021 | Takamatsu | B32B 25/14 |
| 11,453,430 B2 | * | 9/2022 | Shaeff | B62D 1/065 |
| 2019/0077220 A1 | | 3/2019 | Lochmann et al. | |

FOREIGN PATENT DOCUMENTS

| | | | | |
|---|---|---|---|---|
| DE | 29712839 U1 | * | 9/1997 | B62D 1/065 |
| DE | 102004021979 A1 | * | 11/2005 | H05B 3/34 |
| DE | 102010025534 A1 | * | 12/2011 | B62D 1/065 |
| JP | 5969063 U | * | 5/1984 | |

* cited by examiner

*Primary Examiner* — Adam D Rogers
(74) *Attorney, Agent, or Firm* — Matthew D. Thayne; Thayne and Davis LLC

(57) ABSTRACT

A vehicle steering wheel comprising: a rim, an electrical device comprising at least one flexible electrical ribbon cable arranged on or around the rim, wherein: the electrical device comprises at least one positioning part, the positioning part comprising an interface portion, the steering wheel comprises at least one counter-shape arranged to receive the interface portion of the positioning part, and the positioning part covers at least one part of the flexible electrical ribbon cable.

12 Claims, 4 Drawing Sheets

[Fig. 1]
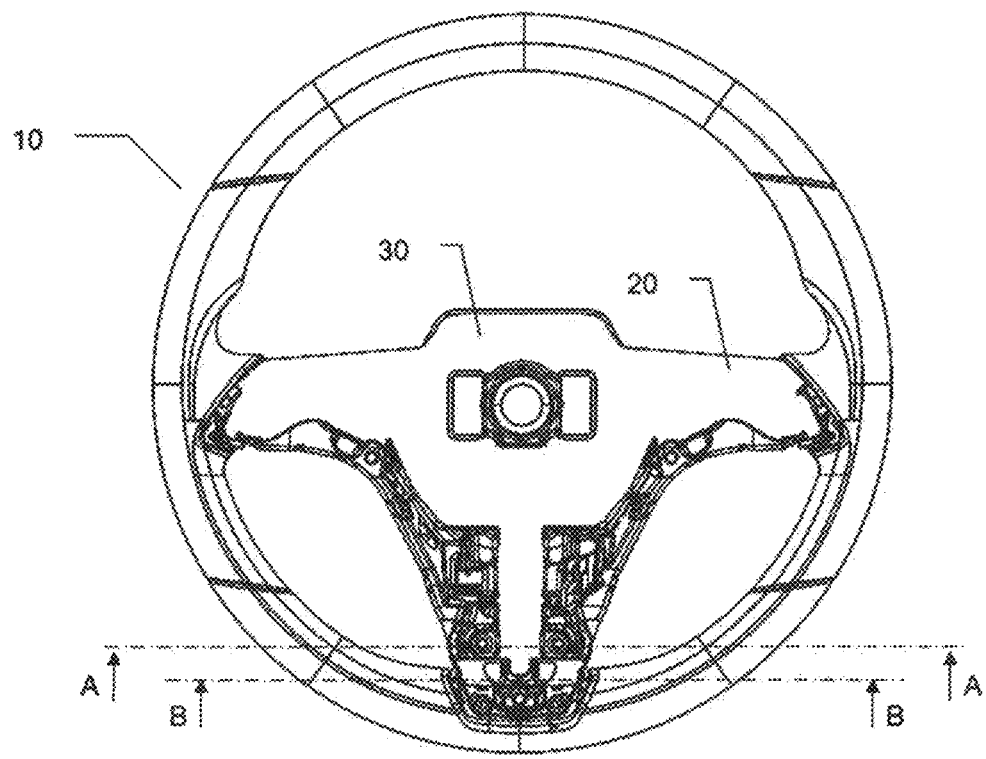
[Fig. 2]
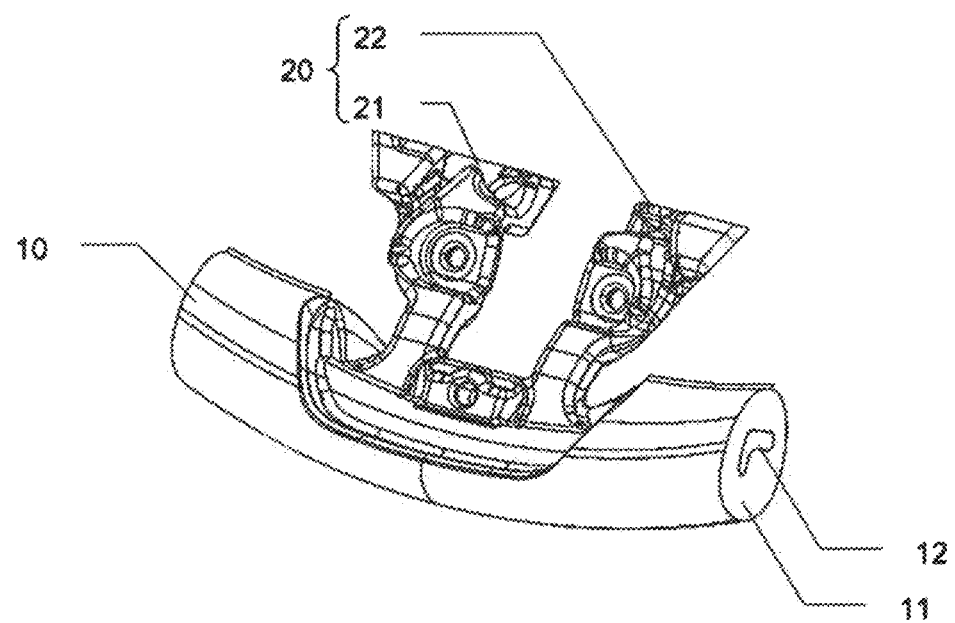

[Fig. 3]
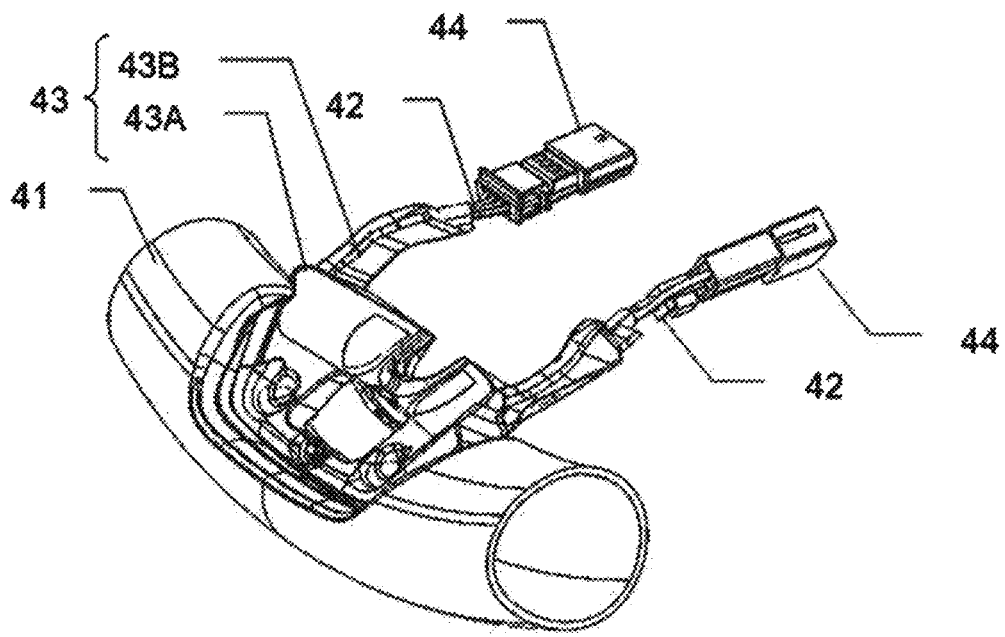
[Fig. 4]
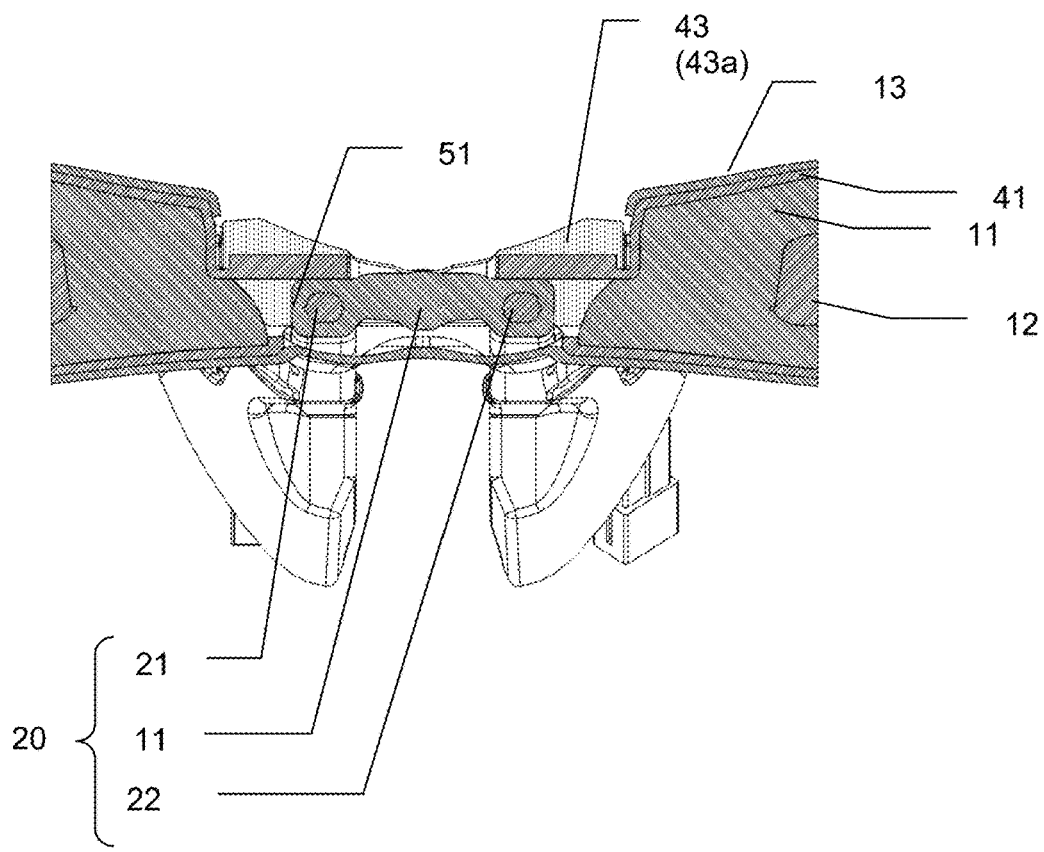

[Fig. 5]
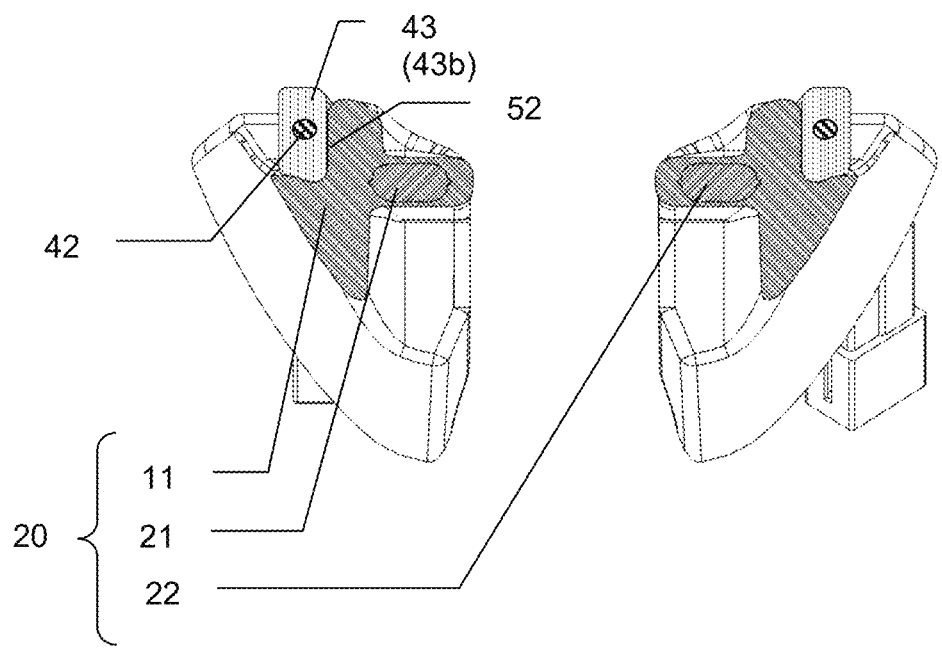
[Fig. 6]
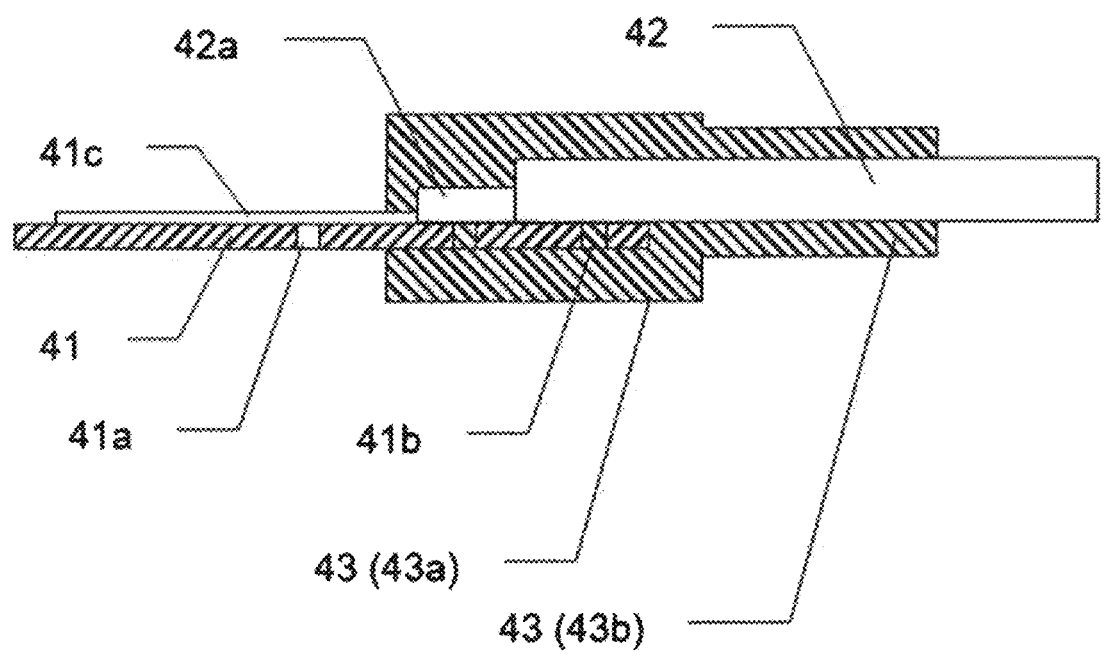

[Fig. 7]
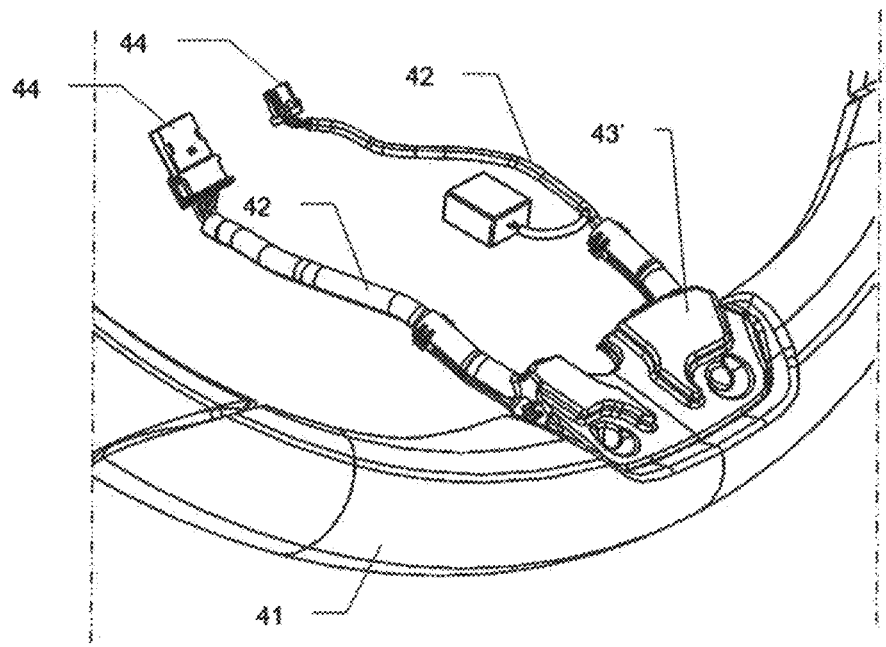
[Fig. 8]
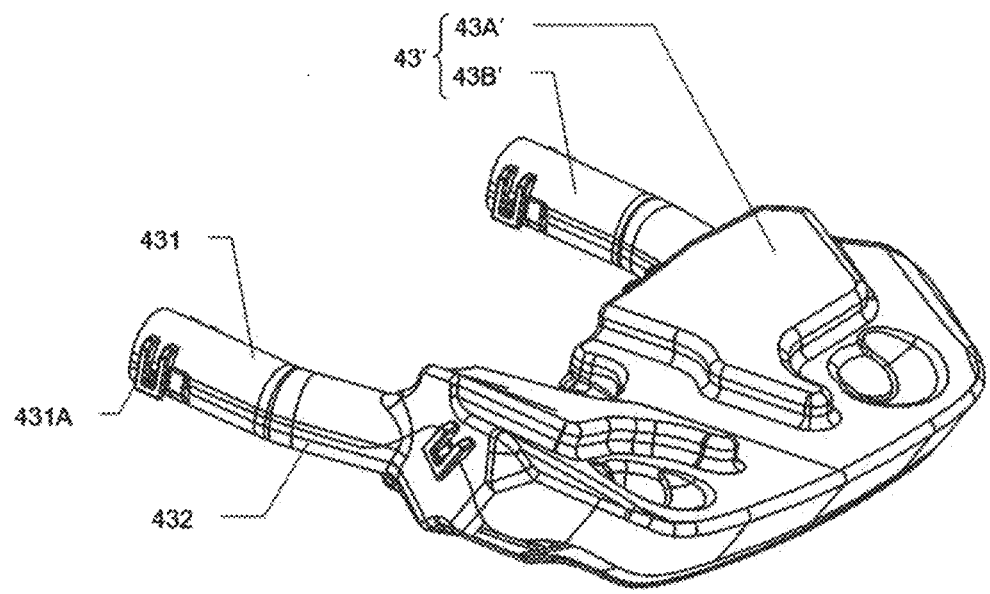

VEHICLE STEERING WHEEL

TECHNICAL FIELD OF THE INVENTION

The present invention generally relates to vehicle steering wheels, and in particular vehicle steering wheels equipped with electrical devices such as contact or proximity detectors between the steering wheel and a user, and/or electrical devices such as heating devices.

STATE OF THE ART

In the prior art of vehicle steering wheels, US20190077220 is known, which describes a heating mat obtained by overmolding a conductive element and power supply cables, is known. On the other hand, this system may have weaknesses in the heating mat, which can easily tear. In addition, and in general, such surface mats are supple and flexible, so that it can be tedious and complicated to correctly position this element on the rim during manufacture.

DISCLOSURE OF THE INVENTION

One aim of the present invention is to address the disadvantages of the prior art mentioned above and in particular, first of all, to propose a vehicle steering wheel with a rim and a flexible electrical ribbon cable, but one which is resistant to tearing, mechanical damage, and/or easy to place on the vehicle steering wheel during manufacture.

For this a first aspect of the invention may therefore relate to a vehicle steering wheel comprising:
- a rim,
- an electrical device comprising at least one flexible electrical ribbon cable arranged on or around the rim, characterized in that:
- the electrical device comprises at least one positioning overmold, the positioning overmold comprising an interface portion,
- the steering wheel comprises at least one counter-shape arranged to receive the interface portion of the positioning overmold.

According to the above embodiment, the positioning overmold is provided to mate with a counter-shape of the steering wheel (typically provided on the rim or a branch of the steering wheel or at the junction between these two elements) to provide a location of the positioning overmold and therefore of the flexible electrical ribbon cable. The handling and assembly phases are simplified by reducing the difficulty of precisely positioning the flexible electrical ribbon cable, which typically supple and likely to fold. In addition, the positioning overmold provides increased mechanical resistance at the counter-shape, which allows the operator to pull on the rest of the flexible electrical ribbon cable to finish the positioning thereof correctly, without risk of degradation.

A second aspect of the invention may concern a vehicle steering wheel comprising:
- a rim,
- an electrical device comprising at least one flexible electrical ribbon cable arranged on or around the rim, characterized in that:
- the electrical device comprises at least one positioning part, the positioning part comprising an interface portion,
- the steering wheel comprises at least one counter-shape arranged to receive the interface portion of the positioning part.

According to the above embodiment, the positioning part is provided to mate with a counter-shape of the steering wheel (typically provided on the rim or a branch of the steering wheel or at the junction between these two elements) to provide a location of the positioning part and therefore of the flexible electrical ribbon cable. The handling and assembly phases are simplified by reducing the difficulty of precisely positioning the flexible electrical ribbon cable, which typically supple and likely to fold. In addition, the positioning part provides increased mechanical resistance at the counter-shape, which allows the operator to pull on the rest of the flexible electrical ribbon cable to finish the positioning thereof correctly, without risk of degradation. Finally, the positioning part provides mechanical protection to the electrical device by forming the interface with the steering wheel and absorbing its friction and physical contact.

According to one embodiment, the positioning part can cover at least part of the flexible electrical ribbon cable. The flexible electrical ribbon cable is thus protected by the positioning part.

According to one embodiment, the positioning part may be a part attached to or distinct from the flexible electrical ribbon cable and/or a power supply cable of the electrical device.

According to one embodiment, the positioning part may be formed by a positioning shell, preferably made of plastic material. Such a shell may be provided to be rigid (in any case less flexible than the flexible electrical ribbon cable) to absorb the forces and physical contact with the rest of the steering wheel.

According to one embodiment, the positioning shell may comprise a first shell and a second shell coupled to the first shell to sandwich part of the electrical device. It is possible to provide a coupling by elastic interlocking (clipping), by screwing, etc. In any case, the positioning shell may be a part attached or fastened to the flexible electrical ribbon cable, preferably with at least one portion of flexible electrical ribbon cable clamped by the positioning shell, or fixed relative to the positioning shell.

According to one embodiment, the steering wheel may comprise a fastening overmolding arranged in the positioning shell to immobilize at least part of the electrical device in the positioning shell. Such a fastening overmolding may typically be applied or formed after the positioning shell has sandwiched the flexible electrical ribbon cable.

According to one embodiment, the positioning part may be formed by a positioning overmold.

According to one embodiment, the electrical device may comprise at least one power supply cable of the flexible electrical ribbon cable, and the positioning overmold or the positioning part can cover at least one area for docking the power supply cable onto the flexible electrical ribbon cable.

According to the above embodiment, the electrical device comprises a positioning overmold between the power supply cable and the flexible electrical ribbon cable, so that this positioning overmold provides additional resistance to the flexible electrical ribbon cable, even if the operator is only grasping the power supply cable. It is typically possible to provide in the docking area a connection of the power supply cable to the electrical circuit of the flexible electrical ribbon cable (typically conductive tracks attached to a flexible substrate). In other words, the docking area may be an electrical and/or mechanical connection zone of the power supply cable onto the flexible electrical ribbon cable.

According to one embodiment, the vehicle steering wheel may comprise a reinforcement, and the counter-shape is at least partially provided on the reinforcement. The reinforcement, which forms a carcass (typically made of magnesium) therefore allows a reference location.

According to one embodiment the vehicle steering wheel may comprise a cladding element such as foam or a decorative piece, and wherein the counter-shape is at least partly provided on the cladding element. Foaming (typically injected polyurethane) or the decorative part makes it possible to design specific counter-shapes and/or complex shapes.

According to one embodiment, the positioning overmold or the positioning part may have at least one portion covering part of the flexible electrical ribbon cable.

According to one embodiment, the positioning overmold or the positioning part may have at least one protrusion surrounding a portion of said at least one power supply cable. Such a protrusion only surrounds the power supply cable and increases the mechanical strength thereof while being able to provide a pre-shape to the power supply cable. In other words, the protrusion forces the cable along a predetermined path corresponding to a shape of the steering wheel, which facilitates its positioning.

According to one embodiment, the positioning overmold or the positioning part may have at least one portion covering part of the power supply cable, preferably over a length greater than 10 mm, and even more preferably over a length greater than 15 mm.

According to one embodiment, the positioning overmold or the positioning part may have at least one portion covering part of the power supply cable, preferably over more than 50% of the length of the cable, and even more preferably over more than 75% of the length of the cable.

According to one embodiment, the protrusion can conform to a second counter-shape of the steering wheel. The ease of manufacture is further improved, while ensuring that the path actually taken by the cable is the intended one: The reproducibility of assembly is improved, and thus any pinching or jamming of the cable by a part added to cover it is avoided.

According to one embodiment, the electrical device may comprise two power supply cables, the positioning overmold or the positioning part may comprise two protrusions each surrounding a portion of at least one power supply cable, and the two protrusions can be arranged on either side of a part of the steering wheel, such as a branch part. The two protrusions can surround a male shape to provide easy centering and assembly.

According to one embodiment, the positioning overmold is made of plastic, preferably thermoplastic, preferably uncharged, or hot-melt-adhesive thermoplastic, such as an adhesive based on ethylene vinyl acetate or EVA. Options include polyamide, silicone, etc.

According to one embodiment, one of the positioning overmold (or the positioning part) or the counter-shape comprises a positioning index, and wherein the other of the positioning overmold (or the positioning part) or the counter-shape comprises a positioning cavity arranged for receiving the positioning index. Such a positioning index can be a centering pin, the positioning cavity may be a through-hole.

According to one embodiment, the positioning index and/or the positioning cavity can be arranged to provide resilient interlocking. It is possible to provide a tight assembly.

According to one embodiment, the flexible electrical ribbon cable may comprise at least one locating hole arranged to locate the flexible electrical ribbon cable relative to an overmolding mold or to the positioning part. The overmolding operation is facilitated and guarantees a reproducible positioning of the positioning overmold or the positioning part relative to the rest of the sheath.

According to one embodiment, the flexible electrical ribbon cable may comprise at least one of a fabric, a nonwoven or a cast, laminated, or injected polymer.

According to one embodiment, the flexible electrical ribbon cable may comprise at least one consolidation hole filled with the material of the positioning overmold. Such consolidation holes allow the overmolding material to be diffused on either side of the flexible electrical ribbon cable if that cable is sealed.

According to one embodiment, the positioning overmold may have a thickness on a single face of the flexible electrical ribbon cable, preferably the docking face of the power supply cable.

According to one embodiment, the positioning overmold or the positioning part may be preferably or mostly arranged on one side of the flexible electrical ribbon cable, with for example 75%, or 85%, or even 90% of the material of the positioning overmold or of the positioning shell located on the same side of the flexible electrical ribbon cable.

According to one embodiment, the vehicle steering wheel may comprise a hub and at least one branch connecting the hub to the branch.

According to one embodiment, the vehicle steering wheel may comprise an outer sheath such as natural or artificial leather covering the flexible electrical ribbon cable.

According to one embodiment, the flexible electrical ribbon cable may be part of a proximity or contact detection device, or may be part of a heating device.

According to one embodiment, the protrusions may follow a shape of complex shape, which is non-planar and non-rectilinear.

A second aspect of the invention relates to a motor vehicle comprising a vehicle steering wheel according to the first aspect.

DESCRIPTION OF THE FIGURES

Other features and advantages of the present invention will become more apparent upon reading the detailed description of two embodiments of the invention, which are provided by way of example but in no way limiting, and shown by the attached drawings, wherein:

FIG. 1 depicts a top view of a vehicle steering wheel according to the invention, partially assembled;

FIG. 2 depicts a portion of a rim of the vehicle steering wheel of FIG. 1;

FIG. 3 depicts a partial view of an electrical device of the steering wheel of FIG. 1;

FIG. 4 depicts a cross-section along axis B-B of FIG. 1;

FIG. 5 depicts a cross-section along axis A-S of FIG. 1;

FIG. 6 depicts a simplified view of the electrical device of FIG. 3;

FIG. 7 depicts a partial view of an alternative embodiment of the electrical device of the steering wheel of FIG. 3;

FIG. 8 depicts a view of a positioning part of the electrical device of FIG. 7.

DETAILED DESCRIPTION OF EMBODIMENT(S)

FIG. 1 shows a top view of vehicle steering wheel comprising a rim 10, a hub 30 and branches 20 connecting the rim 10 to the hub 30. The vehicle steering wheel is partially assembled, so as to show the internal structure, especially at the lower branch 20 (or at 6-o'clock) and its junction with the rim 10.

Indeed, as shown in FIG. 2, the lower branch 20 is mainly formed by two reinforcement strands 21 and 22. The rim 10 also comprises a reinforcement portion 12 and a foam 11 (typically made of polyurethane) overmolded on the reinforcement portion 12. The reinforcement (the reinforcement strands 21 and 22, the reinforcement portion 12) form a metal frame or framework (for example made of magnesium) of the vehicle steering wheel.

FIG. 3 shows part of an electrical device, located at the part of the vehicle steering wheel shown in FIG. 2. The electrical device may be, as here, a sensor for detecting contact or proximity with a user. FIG. 3 therefore shows the electrical device alone, and FIG. 2 shows the rim part 10 and its junction with the branch 20 that will accommodate the electrical device. It should be noted that in this FIG. 3, the electrical device is shown in its final state, that is sheathed on the rim 10. Before sheathing, it may have a different shape, one that is flat or slightly formed depending on the material(s) used to produce it.

In particular, a flexible electrical ribbon cable 41 covers and surrounds part of the rim 10 (not shown in FIG. 3), two power supply cables 42 with connectors 44 are provided to connect the flexible electrical ribbon cable 41 to an electrical network of the vehicle.

Finally, at the area where the power supply cables 42 are attached to the flexible electrical ribbon cable 41, a positioning part here formed by a positioning overmold 43 is provided. The positioning overmold 43 covers, with a portion 43a, part of the flexible electrical ribbon cable 41 and supply cables 42, so that mechanical reinforcement of the flexible electrical ribbon cable 41 is obtained.

It can be noted that the positioning overmold comprises two protrusions 43b which overmold only each power supply cable 42 in order to follow the complex shape of the second counter-shape 52 on the two reinforcement strands 21 and 22.

FIG. 4 shows a cross-section along the axis B-B of FIG. 1, and shows the flexible electrical ribbon cable 41 covered by an outer sheath 13 at the rim (right and left parts of the Figure). The flexible electrical ribbon cable 41 has parts opposite the foam 11 and the two reinforcement strands 21 and 22 of the branch 20. Furthermore, the positioning overmold 43 (the part 43a) has lower lateral edges which fit on the outer shapes of the foam 11, so as to provide positioning of the positioning overmold 43 on this counter-shape of the steering wheel (of the foam 11).

The foam may be made of polyurethane, and may form and/or leave accessible a first counter-shape 51. As will be explained below, the reinforcement strands 21 and 22 may form a second counter-shape 52.

The first counter-shape 51 essentially consists of lateral faces of the branch 20 (formed by the foam 11 or the metal reinforcement) and/or a through-hole visible in FIG. 2, and/or the junction of the two lateral edges of the two reinforcement strands 21 and 22 with the rim 10, while the second counter-shape 52 is formed by the lateral edges of the two reinforcement strands 21 and 22, as can be seen in FIG. 5.

Furthermore, a positioning index as well as flanges can be provided on the positioning overmold 43, to provide coupling with the first counter-shape 51 (the lateral edges of the branch 20, and/or the hole and/or the radiated edges of the reinforcement at its connection between the rim 10 and the branch 20). The positioning index can be a pin which enters the hole of the first counter-shape 51.

FIG. 5 shows a cross-section along the axis A-A of FIG. 1, and shows the protrusions 43b of the positioning overmold 43 which surround the power supply cables 42, and which are also coupled or attached to the foam 11 which covers the reinforcement strands 21 and 22. Thus, the positioning overmold 43 (in particular the two protrusions 43b) provides additional positioning. It may be noted that the protrusions 43b follow complex shapes of the branch 20, which guarantees that the available space is used effectively. The rigidity of the protrusions 43b makes it possible to guarantee greater positioning reproducibility than the situation where the power supply cables 42 are not overmolded. Provision may be made to overmold the power supply cables 42 over a distance greater than 10 mm, and even greater than 15 mm, starting from the overmolding part 43a.

FIG. 6 depicts a schematic view of the electrical device of FIG. 3. The flexible electrical ribbon cable 41 has a conductive track 41c, connected for example by brazing to a conductor 42a of the power supply cable 42.

The positioning overmold 43 (the part 43a) covers part of the flexible electrical ribbon cable 41 and of the power supply cable 42, and has a protrusion 43b only at the power supply cable 42.

One or more positioning holes 41A are provided in the flexible electrical ribbon cable 41 to allow the flexible electrical ribbon cable 41 to be positioned in an overmolding mold to attach the positioning overmold 43.

Passage holes 41b are provided in the flexible electrical ribbon cable 41 to accommodate the plastic from the positioning overmold 43 and thus provide a robust link.

The positioning overmold 43 therefore makes it possible to provide reliable positioning on a counter-shape of the steering wheel, while providing additional mechanical resistance.

It is of course possible to provide the positioning overmold 43 at the area of the flexible electrical ribbon cable 41 which receives a supply cable 42, to further improve the mechanical strength, but this is optional.

The positioning overmold parts 43 (the protrusions 43b) around the power supply cables 42 are another option which improves assembly reproducibility and ease of assembly.

In the given example, the area for docking the power supply cable 42 on the flexible electrical ribbon cable 41 is carried out at the lower branch 20, but this is optional; it is possible to provide this area on any portion of the steering wheel.

The reinforcement has two reinforcement strands 21 and 22, but it is possible to provide a single branch.

The counter-shapes that receive the positioning overmold are formed in this example by the foam 11 and/or the reinforcement, but it is possible to provide counter-shapes on trim parts (typically plastic shells).

FIG. 7 depicts an alternative of the electrical device of FIG. 3. In particular, the electrical device of FIG. 7 differs from that of FIG. 3 essentially at the positioning part. The electrical device of FIG. 7 always comprises the flexible electrical ribbon cable 41, two power supply cables 42 that terminate in connectors 44, and a positioning part formed here by a positioning shell 43'. The positioning shell 43' covers part of the flexible electrical ribbon cable 41 and part of the two power supply cables 42.

As shown in FIG. 8, in this example, the positioning shell 43' comprises a first shell 431 and a second shell 432. However, a single piece could be provided, or more than two pieces, to form the positioning shell 43'. Furthermore, it may be noted that the first shell 431 comprises elastic tabs 431A to be coupled with the second shell 432 by resilient engagement (clipping). Other coupling modes (screwing, welding, etc.) can be provided.

The first shell 431 and/or the second shell 432 can be made of plastic material, such as for example a polymer, with or without filler material. It is possible to provide polyamide. for example.

FIG. 8 also shows that the positioning shell 43' comprises a portion 43A' arranged to cover the flexible electrical ribbon cable 41, and a portion 43B' which covers only the power supply cables 42. It can also be noted that the part for docking or connecting the power supply cables 42 to the flexible electrical ribbon cable 41 is also covered by the positioning shell 43'.

The positioning shell 43' is clipped onto the electrical device, so as to sandwich or pinch the power supply cables 42 and/or the flexible electrical ribbon cable 41 in order to hold them and absorb the contact forces with the steering wheel.

It is also possible to provide an overmolding of the electrical device in the positioning shell 43'. Indeed, a plastic or glue can be injected into the positioning shell covering the electrical device to secure the components together and guarantee zero relative movement and therefore a perfect fit.

Thus, the part for docking or connecting the supply cables 42 to the flexible electrical ribbon cable 41, and/or the power supply cables 42 and/or the flexible electrical ribbon cable 41 are integral with the positioning shell 43', which can interface with the reinforcement of the steering wheel or any other part thereof.

INDUSTRIAL APPLICATION

A vehicle steering wheel according to the present invention, and its manufacture, are capable of industrial application.

It will be understood that various modifications and/or improvements which are obvious to a person skilled in the art may be made to the different embodiments of the invention described in the present description without departing from the scope of the invention.

The invention claimed is:

1. A vehicle steering wheel comprising:
   a rim,
   an electrical device comprising at least one flexible electrical ribbon cable arranged on or around the rim, characterized in that:
   the electrical device comprises at least one positioning part, the positioning part comprising an interface portion,
   the steering wheel comprises at least one counter-shape arranged to receive the interface portion of the positioning part, the at least one counter-shape having a shape that at least partially mirrors a shape of at least a portion of the interface portion;
   and in that the positioning part covers at least one part of the flexible electrical ribbon cable.

2. The vehicle steering wheel according to claim 1, wherein the positioning part is formed by a positioning shell.

3. The vehicle steering wheel according to claim 2, wherein the positioning shell comprises a first shell and a second shell coupled to the first shell to sandwich a part of the electrical device.

4. The vehicle steering wheel according to claim 1, wherein the positioning part is formed by a positioning overmold.

5. The vehicle steering wheel according to claim 4, wherein the positioning overmold is made of plastic.

6. The vehicle steering wheel according to claim 1, wherein the electrical device comprises at least one power cable of the at least one flexible electrical ribbon cable, and wherein the positioning part covers at least one region for docking the at least one power cable on the flexible electric layer.

7. The vehicle steering wheel according to claim 6, wherein the positioning part has at least one protrusion surrounding a portion of said at least one power cable.

8. The vehicle steering wheel according to claim 7, wherein the at least one protrusion conforms to a second counter shape of the at least one counter-shape of the steering wheel.

9. The vehicle steering wheel according to claim 8, wherein the at least one power cable comprises two power cables, wherein the positioning part comprises two projections each surrounding a portion of the at least one power cable, and wherein the two projections are arranged on either side of part of the steering wheel.

10. The vehicle steering wheel according to claim 6, wherein the positioning part has at least one portion covering part of the at least one power cable over a length greater than 10 mm.

11. The vehicle steering wheel according to claim 1, comprising a frame, and wherein the counter shape is at least partly provided on the frame.

12. The vehicle steering wheel according to claim 1, comprising a cladding element, and wherein the counter shape is at least partly provided on the cladding element.

* * * * *